INVENTORS
G. M. PAVEY, JR.
R. H. PEARSON

BY R. M. Hicks

ATTORNEY

United States Patent Office 3,281,768
Patented Oct. 25, 1966

3,281,768
METHOD AND CARDIOID SYSTEM COMPRISING PRESSURE SENSOR MEANS WITH OUTPUT COMPENSATED DISPLACEMENT OR ACCELERATION SENSOR
George M. Pavey, Jr., Dallas, and Raymond H. Pearson, Richardson, Tex., assignors to Sonic Engineering Company, Dallas, Tex.
Filed Mar. 11, 1965, Ser. No. 438,923
12 Claims. (Cl. 340—7)

This invention relates to an acoustic detecting device and more particularly to a cardioid system comprising a displacement or acceleration sensor connected to the output of a pressure sensor for sensing and recording seismic signals with a high degree of fidelity when employed in a system for surveying subsurface geological formations in water covered areas. The invention in its broader aspects provides a new and improved system effecting a high fidelity seismic survey of subaqueous areas by eliminating spurious signals reflected downwardly from the air-water interface received by detectors disposed within a submerged detector streamer, regardless of the depth of submersion of the streamer.

It has been the usual practice, heretofore, in modern systems of this character such, for example, as the system entitled Method and Underwater Detector Streamer Apparatus for Improving the Fidelity of Recorded Seismic Signals disclosed and claimed in application Serial No. 344,670, filed February 13, 1964, by G. M. Pavey, Jr. and R. H. Pearson to employ vertically mounted particle velocity detectors serially connected in the output circuit and several pressure responsive devices to generate a voltage signal of equal and opposite polarity to the signal generated by the pressure responsive devices in response to a secondary wave acting on the streamer and reflected downwardly from the air-water interface.

In addition to particle velocity an acoustic wave has associated therewith instantaneous particle displacement and instantaneous particle acceleration, two additional vector quantities each of which is susceptible to measurements by suitable instrumentation.

It should be noted, however, that displacement and acceleration do not possess a simple relationship with pressure which is independent of wave frequency as does velocity. It is well known that a reduction in frequency of an acoustic wave is accompanied by an increase in displacement. It is also well known that velocity is the first time derivative of displacement and acceleration is the first time derivative of velocity. This relationship may be set forth as follows:

$$v = 2\pi f x d$$
$$a = 2\pi f x v$$

Thus, velocity is $2\pi$ times frequency times displacement and, in like manner, acceleration is $2\pi$ times frequency times velocity.

For this reason, displacement or acceleration sensors could be used in lieu of velocity sensors in the output of the pressure sensing devices, if the electrical signal generated by the displacement or acceleration sensors was properly treated to compensate for the change with frequency of the acoustic wave. The manner in which this result is achieved will be more clearly apparent as the description proceeds.

One of the objects of the present invention is to provide new and improved means for electrically differentiating the output of a particle displacement sensing device for an acoustic wave in a manner to bring it into a predetermined voltage relationship with the output of a pressure responsive device sensing the acoustic wave thereby to provide an output from the particle displacement sensing device which is proportional to the velocity of the acoustic wave.

Another of the objects is to provide new and improved means for electrically integrating the output of a particle acceleration sensing device for an acoustic wave in a manner to bring it into a predetermined voltage relationship with the output of a pressure responsive device sensing the acoustic wave at substantially the same wave front to provide an output from the particle acceleration sensing device which is proportional to the velocity of the acoustic wave.

A further object resides in the cancellation of the effect of a secondary seismic wave reflected downwardly from the surface of the water and sensed by a pressure sensing device and concurrently therewith by a particle wave displacement device.

A still further object resides in the cancellation of the effect of a secondary seismic wave reflected downwardly from the surface of the water and sensed by a pressure sensing device and concurrently therewith by a particle wave acceleration device.

Still other objects, advantages and improvements will be apparent from the following description, taken in connection with the accompanying drawings of which.

Figure 1:
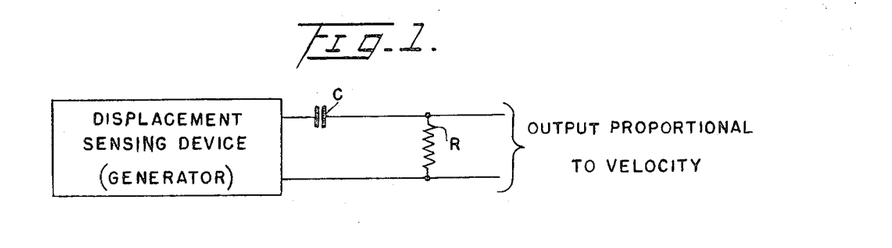
FIG. 1 is a schematic diagram of an instantaneous particle displacement sensing device with an electrical differentiator connected thereto.

Referring now to the drawings for a more complete understanding of the invention on which like numerals of reference are employed to designate like parts throughout the several views and more particularly to FIG. 1 thereof, there is shown thereon a displacement device or sensor responsive to instantaneous particle displacement of an acoustic wave and having connected thereto an electrical differentiator circuit constructed and arranged to provide an electrical output which is proportional to the velocity of the acoustic wave at the point sensed by the displacement device.

Since, as is well known, as the wave frequency decreases the displacement of an acoustic wave becomes larger, a network is therefore required to be added to the output of the wave displacement sensing device to compensate for this characteristic. This network is shown on FIG. 1 and comprises a capacity-resistance filter or electric differentiator in which the capacity of the sensor or electrical generator is indicated schematically by the capacitor C which, for example, may have a capacity of .004 mfd. It is merely necessary in the instant case in which the pass band is set within the range of 10 c.p.s. to 100 c.p.s. to place a resistive shunt across the generator of such value that the capacitive reactance is at all times larger than the resistive load for the pass band.

The present invention is well adapted for use with seismic survey systems of water covered areas such, for example, as the seismic system disclosed and claimed in the copending application of George M. Pavey, Jr. et al. for Method and Underwater Detector Streamer Apparatus for Improving the Fidelity of Recorded Seismic Signals, Serial No. 344,670 filed February 13, 1964, in which is employed a plurality of pressure sensors, particle velocity sensing devices and, if desired, noise cancellors.

If it be assumed, by way of example, that the displacement sensing device of FIG. 1 comprises 40 displacement sensors connected in parallel and each having a capacity of .004 mfd., the value of capacity of capacitor C is .16 mfd. Furthermore, it is known that the capacitive reactance of .16 mfd. at 100 c.p.s. is 10,000 ohms.

By employing a resistor R having a value of 10,000 ohms as the load resistor at all frequencies below 100 cycles per second the reactance is greater than the resistance and the output of this system is now proportional to the velocity of the acoustical wave for frequencies below 100 c.p.s.

This output can be substituted for the output of the velocity sensing moving coil phones of application Serial No. 344,670 supra and the same beneficial result will be obtained.

Figure 2:
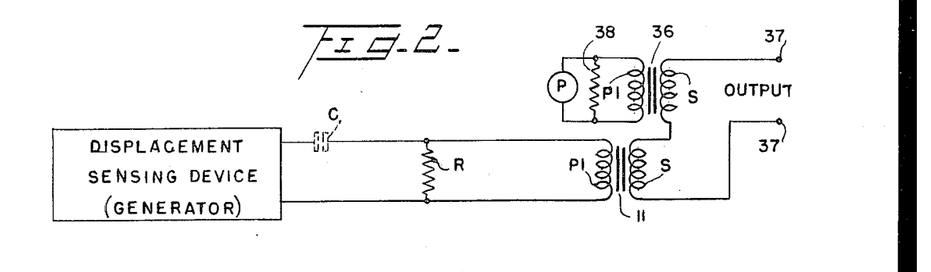
FIG. 2 is a circuit arrangement suitable for use with the present invention and employing the device of FIG. 1.

As shown on FIG. 2, when effecting this connection between the electrically differentiated output of the piezoelectric phones or sensors comprising the particle displacement sensing devices and the pressure sensing devices, a transformer 11 is required for the reason that these piezoelectric phones or sensors are high impedance devices and are required to work into a low impedance line.

The displacement sensing unit may be constructed, if desired, from such devices as semi conductor strain gauge elements and when connected to the pressure sensing devices as shown on FIG. 2 a geophysical instrument with a cardioid directional pattern is produced.

Figure 5:
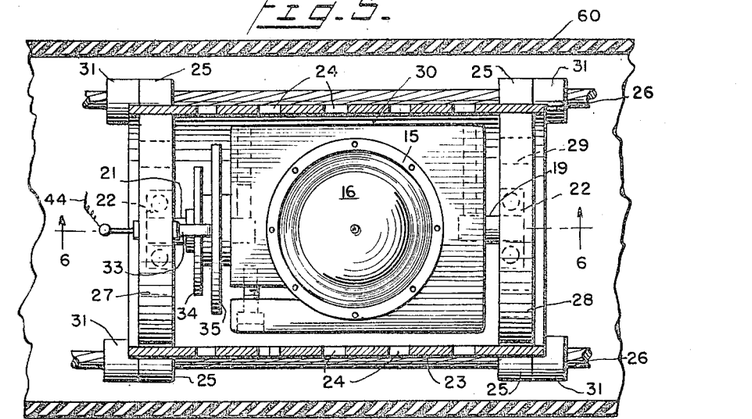
FIG. 5 is a plan view and partially in section of a wave particle displacement sensing device suitable for use with the present invention and disposed within a flexible streamer and gimbal structure for supporting the device in a predetermined substantially vertical position.

This will best be understood by reference to FIG. 5 in which the displacement sensing device is gimbal mounted and enclosed within an oil filled detection streamer in a manner similar to the particle velocity phones of application Serial No. 344,670 supra.

Figure 6:
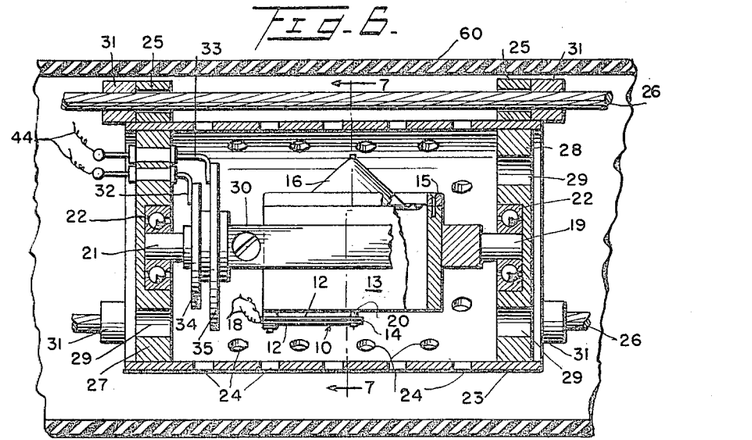
FIG. 6 is a view partially in section and partially in elevation taken substantially along the line 6—6 of FIG. 5.
Figure 7:
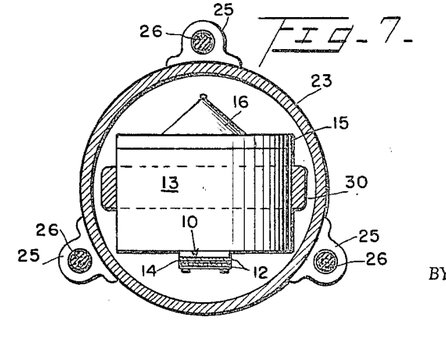
FIG. 7 is a view partially in section and partially in elevation taken substantially along the line 7—7 of FIG. 6.

Referring now more particularly to FIGS. 5 and 6 on which is illustrated a displacement sensing device suitable for use with the present invention, there is shown thereon a bimorph piezoelectric elongated element generally indicated by the numeral 10 supported at one end thereof at the lower peripheral portion of a relatively heavy annular member 13 and preferably insulated therefrom in such manner that the other end portion of the bimorph element is disposed in intersecting relation with the axis of the annular member substantially as shown. This bimorph strip, as shown in FIG. 6, for example, preferably comprises a pair of ceramic elements 12 of preferably .750" in length, .375" wide and .009" in thickness cemented or otherwise bonded to a flexible steel strip 14 disposed therebetween.

Figures 10, 11, 12:
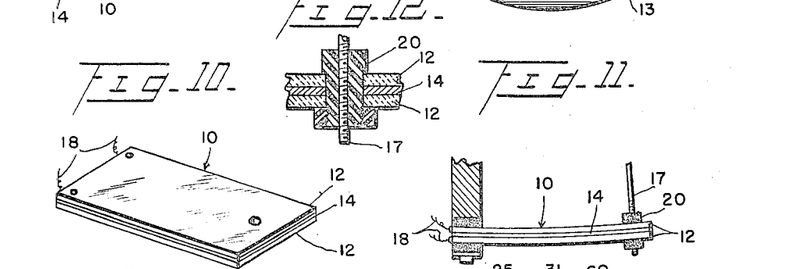
FIG. 10 is a view in perspective of a bimorph piezoelectric element for use with the device of FIGS. 6 and 8.
FIG. 11 is a view of the bimorph element in a moved or stressed condition.
FIG. 12 is a fragmentary view in section of the bimorph element and the actuating rod connected thereto.

To the upper surface of the annular member 13 is secured, as by the clamping ring 15 illustrated, a circular cone-shaped flexible diaphragm 16 composed of material suitable for the purpose such, for example, as thin Dural or molded phenolic having the apex portion thereof connected as by the rod 17 to the inner end portion of the bimorph strip 10 in such manner as to impart a bending action thereto in accordance with the degree and direction of movement of the conical diaphragm with respect to the relatively heavy annular member 13, such, for example, as shown on FIG. 11.

The lower end portion of the rod 17 is preferably threaded to receive a sleeve preferably composed of insulating material and having a head on one end and a nut threaded on the other end for effecting a clamping connection to the bimorph element 10, FIG. 12, the clamping structure being indicated generally by the numerical 20.

Figures 13, 14:
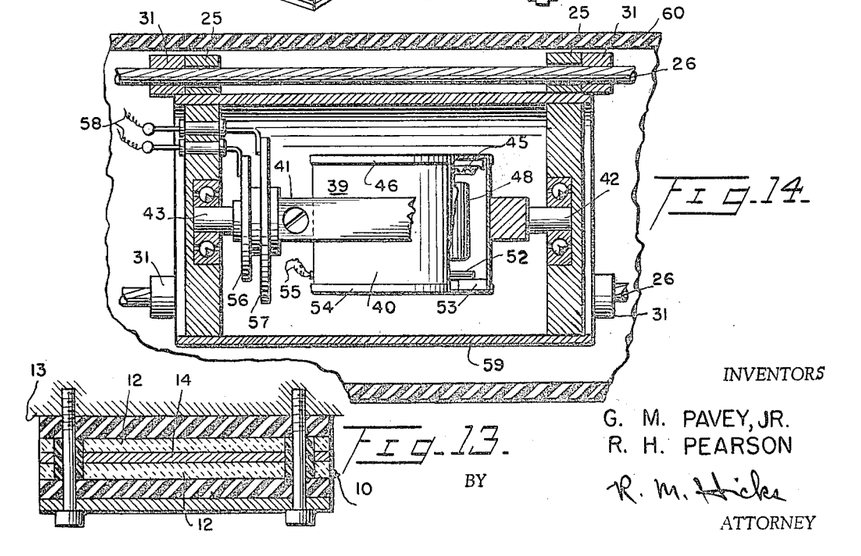
FIG. 13 is an enlarged fragmentary sectional view of the piezoelectric element and the mounting structure therefor taken along the line 13—13 of FIG. 8.
FIG. 14 is a longitudinal sectional view of a wave particle acceleration sensing device and mounting therefor similar to the device of FIG. 6.

The other end of the bimorph element, as most clearly shown on FIG. 13, is clamped to the lower edge of the annular member 13 by the screws and mounting strip illustrated and suitably insulated from the annular member 13 preferably by a pair of insulating strips disposed on opposite sides respectively of the bimorph element and in contact therewith. The foregoing arrangement provides a structure in which both sides of the diaphragm are open and exposed to the acoustic wave.

An arrangement is thus provided in which the weight of the moving system is low and the compliance thereof high whereby the moving system is actuated to a high degree by the displacement of the medium within which the device is immersed. The clamping ring and annular member, on the other hand, are relatively heavy and have a small area exposed to the wave whereby the annular member tends to remain substantially unmoved by the acoustic wave and thereby produce a relative motion between the annular member and the diaphragm in such manner that the motion differential therebetween causes a bending moment to be applied to the ceramic strip as shown, for example, on FIG. 11.

The ceramic layers, it will be noted, are applied in opposite polarities whereby when one is stretched and the other simultaneously compressed during a bending action, an additive voltage is produced at the conductors 18 connected thereto having a polarity and amplitude in accordance with the direction and strength of the bending force applied to the bimorph element 12 by the diaphragm 16 and rod 17 connected therebetween.

The annular member 13 has secured thereto in any suitable manner as by the support 30 a pair of bearing shafts 19 and 21 in mutually aligned relation with the axis thereof normal to and intersecting the axis of the annular member 13. The outer ends of the shafts are fitted for rotative movement within the ball bearings 22.

The structure for mounting the instantaneous wave displacement sensing unit comprises a tubular casing 23 perforated at 24 and provided with a plurality of outstanding ears 25 having holes therein within which the strain cables 26 of the oil filled detector streamer are disposed.

The tubular casing 23 has fitted therein a pair of end plates 27 and 28 each recessed to receive a ball bearing 22. Each of the plates 27 and 28 is provided with a plurality of apertures 29 which, together with the perforations 24, provide an arrangement in which the oil with which the streamer is filled completely fills the tubular casing 23 and renders the flexible diaphragm responsive to particle displacement of the oil as the acoustic wave approaching from either above or below is sensed by the device. A plurality of sleeves 31 swaged or otherwise secured to the strain cables prevents axial movement of the sensing device therealong.

End plate 27, it will be noted, is provided with a pair of brushes 32 and 33 each having a conductor 44 connected thereto and respectively engaging disks 34 and 35 to which the bimorph element is connected by conductors 18 as is well known in the electrical art. An arrangement is thus provided for establishing a continuous external electrical connection to the bimorph element regardless of rotative or oscillatory movement of the particle displacement sensor about the axis of rotation thereof.

Figure 8:
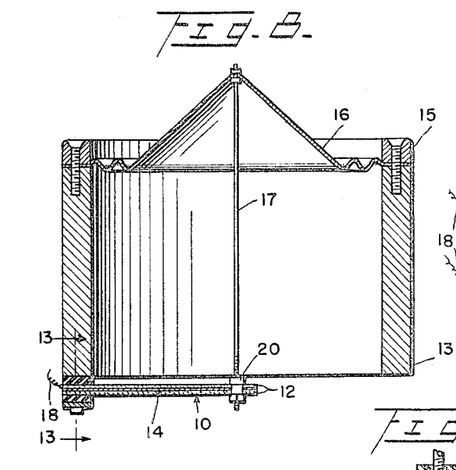
FIG. 8 is a sectional view in elevation and somewhat enlarged of the wave displacement sensing device of FIG. 6.
Figure 9:
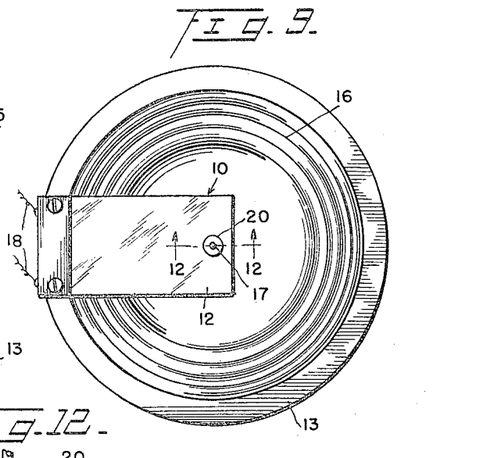
FIG. 9 is a bottom plan view of the device of FIG. 8.
Figures 20, 22:
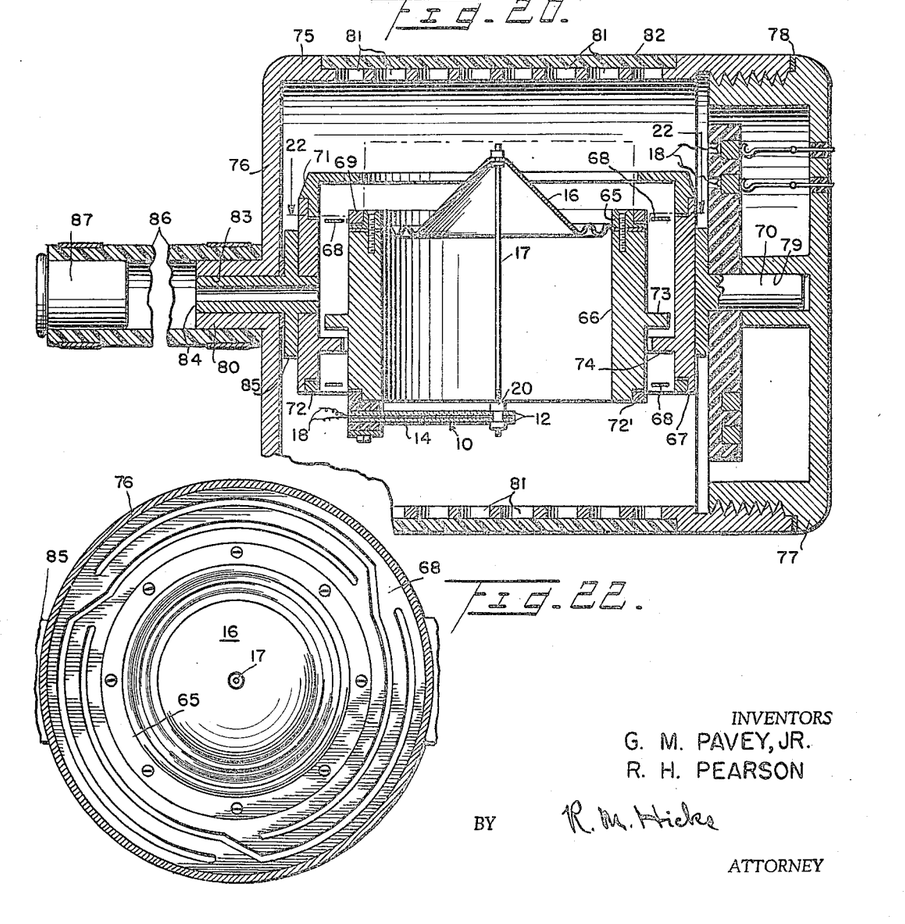
FIG. 20 is a view partially broken away of an alternative form of the device of FIG. 6 with the inertia member flexibly supported within a gimbal ring pivotally mounted within an oil filled casing.
FIG. 22 is a sectional view taken substantially along the line 22—22 of FIG. 20.

Referring now to FIG. 20 there is shown thereon a wave particle displacement sensing device according to an alternative form thereof suitable for use with the present invention. The device, like the device of FIG. 6, comprises a circular cone-shaped flexible diaphragm 16 composed of material such thin Dural or molded plastic clamped at the outer peripheral portions thereof as by the clamping ring 65 and screws illustrated to the upper end surface of a relatively heavy annular inertia member 66. An elongated bimorph piezoelectric element generally indicated by the numeral 10 is supported at one end thereof at the lower peripheral portion of the annular member 66 and preferably insulated therefrom in such manner that the other end portion of the bimorph element intersects the axis of the annular member 66 and is connected as by the rod 17 to the apex portion of the diaphragm 16 generally in the manner of FIG. 8. The annular element 66 is disposed within a somewhat larger hollow cylindrical sleeve 67 and yieldably supported for vertical movement in either direction by a pair of circular spring members 68, the upper spring member being clamped at an inner portion thereof to clamping ring 65 by annular member 69 and at the outer portion to sleeve 67 by annular member 71 force fitted into an upper portion of sleeve 67 and having the interior diameter thereof less than the outer diameter of annular member 69 thereby to form a stop to limit upward movement of the annular member 66 with respect to sleeve 67. The lower spring member 68 is secured as by clamping ring 72 at the exterior portion thereof to the lower end portion of annular member 67 and at the interior portion thereof to the lower portion of sleeve 66 as by clamping member 72¹ forced around a depending portion of member 66 into tight engagement therewith.

There is also provided an outwardly extending fin 73 about the outer cylindrical surface of member 66 of slightly less outer diameter than the inside diameter of sleeve 67 which cooperates with an inwardly extending circular fin 74 secured to sleeve 67 and of somewhat less diameter than the outer diameter of annular member 66 to provide viscous damping of the vertical movement of member 66 within sleeve 67 and in addition thereto to provide a stop limiting the degree of downward movement of the member 66 within the sleeve 67.

Secured to sleeve 67 above the center of gravity thereof and projecting radially outwardly therefrom is a bearing shaft 70 carrying a pair of slip rings insulated as shown and connected by wires 18 to the piezoelectric element 10.

The gimbal mounted sensing device is enclosed by casing 75 having a base 76 on one end thereof and threaded at the opposite end for threaded engagement with a cap member 77 carrying a pair of brushes respectively contacting the slip rings and providing means for establishing an external electrical connection thereto. A gasket 78 is preferably provided for establishing an oil tight connection between the casing 75 and the cap. The cap 77 is provided with a sleeve bearing 79 to receive the shaft 70 for rotation therein.

Casing 75 is also provided with a plurality of apertures 81 circumferentially disposed and sealed with a flexible plastic sleeve 82 composed of material suitable for the purpose such, for example, as neoprene thereby to form a multi-apertured window about the device to provide fluid communication of the particle displacement component of a seismic acoustic wave with the interior of the casing 75.

The base 76 of the casing is provided with an axially protruding sleeve portion 80 carrying a bearing 83 to receive and rotatably support a hollow bearing member 84 having a flanged portion 85 secured in any suitable manner, as by soldering the parts together, to sleeve 67 like the bearing shaft 70 and diametrically opposite therefrom.

A length of expansible flexible tubing 86 is fitted to the sleeve portion 80 of the base 76 and clamped thereto as by the punch-lock clamp illustrated thereby to provide means for filling the casing 75 with oil and thereafter sealing it by insertion of the stopper 87 into the outwardly projecting end portion of the tubing and sealing the tubing thereto as by the clamp illustrated. This structure provides an expansible oil filled chamber in communication with the interior of casing 75 and prevents damage to the casing and the instrument disposed therein as the result of temperature changes in the ambient medium in contact therewith.

Figure 21:
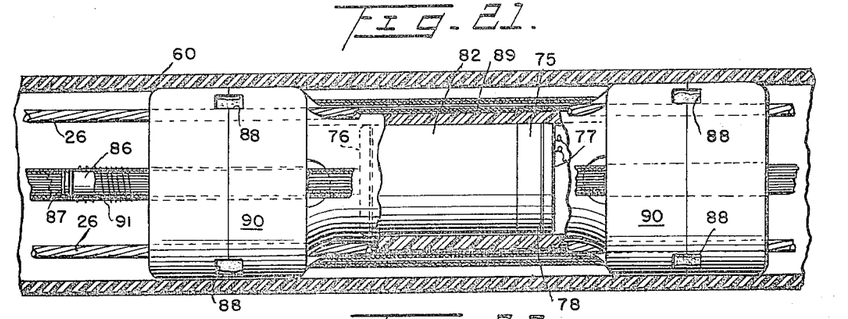
FIG. 21 is a view partially broken away of the device of FIG. 20 with the casing thereof flexibly mounted within an oil filled detection streamer.

The manner in which the casing 75 is flexibly mounted within an oil filled detection streamer will best be understood by reference to FIG. 21 in which the streamer comprises an outer flexible hose or tubing 60 having three equally spaced strain cables 26 extending throughout the length thereof and secured at intervals to a plurality of floats or spacer members 90 as by a lump of solder bonded to the cables through apertures 88 within the spacers. Each of the casings 75 is snugly fitted within and carried by a flexible sleeve 89 composed of a flexible plastic suitable for the purpose and having a length slightly greater than the distance between two adjacent spacers whereby the end portions of the sleeve 89 are flared outwardly when the sleeve is forced between the spacers. Each sleeve is provided with three arcuately configured cut out portions on each end thereof through which the strain cables 26 are arranged and three somewhat larger cut out portions on each end thereof disposed intermediate the smaller cut out portions through which the signal wires extend in three branches and are arranged longitudinally between the flexible sleeve 89 and the flexible streamer hose 60 from whence the branches are brought together at opposite ends of the casing 75 and pass through an axial aperture within the adjacent spacers. The aperture within each of the spacers, it will be noted, is sufficiently large to admit the tubing 86 with the signal wires arranged axially therealong and preferably lashed thereto as at 91.

An arrangement is thus provided in which the particle displacement component of an acoustic seismic wave may be received with a high degree of fidelity regardless of a tensed condition of the strain cables within the streamer. The particular means for flexibly mounting the inertia element on the gimbal structure and the flexible mounting structure for the entire sensing device within a flexible underwater detector streamer are disclosed and claimed in our copending application for Method and Underwater Detector Streamer Apparatus for Improving the Fidelity of Recorded Seismic Signals, Serial No. 344,670 filed February 13, 1964.

On FIG. 2 is shown a circuit arrangement suitable for use with the present invention in which the particle displacement devices which may comprise 40 parallel connected sensing units of the type illustrated on FIG. 6 or FIG. 20, as the case may be, are connected to a capacity-resistance filter or electric differentiator comprising a capacitor C and a resistance element R. The compensated output of the displacement devices is applied to the primary winding $P_1$ of transformer 11 connected in parallel with resistance R. The secondary winding S of transformer 11 is connected in series with the secondary winding S of transformer 36 and the output terminals 37. In the practice of this invention it has been found desirable to connect the terminals 37 to the input of an implifier and thence to a pen recorder on the vessel for effecting a high fidelity graph of the subaqueous geological formations surveyed by the system.

The primary winding of transformer 11 is connected to the pressure responsive devices P, which may constitute about twenty in number, all connected in parallel and shunted preferably by the resistance element 38 to smooth out the signal therefrom. The foregoing circuit provides an arrangement in which the acoustic wave instantaneous particle displacement is sensed by a plurality of particle displacement devices having the output thereof electrically differentiated in such manner as to compensate for variations in frequency of the acoustic wave within a predetermined frequency band and produce a voltage proportional to wave velocity. This differentiated output is superimposed upon the output of the pressure sensing devices in a manner to cancel secondary seismic signals reflected downwardly from the air-water interface and produce a geophysical instrument having a cardioid directional pattern.

Figure 3:
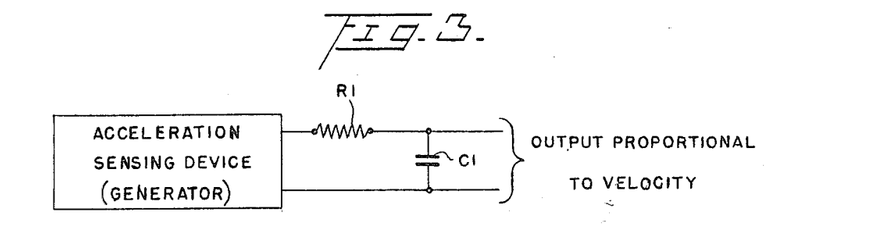
FIG. 3 is a schematic diagram of an instantaneous particle acceleration sensing device with an electrical integrator connected thereto.

Referring now to FIG. 3 there is shown thereon an acceleration sensing device or sensor responsive to the acceleration of an acoustic wave and having connected thereto an electrical integrating circuit constructed and arranged to provide an electrical output which is proportion to the velocity of the acoustic wave at the point sensed by the acceleration device.

Let it be assumed, by way of example, that the capacity of the generator or acceleration device is .3 mf. It is necessary that the capacity of the capacitor $C_1$ shall be less than the capacity of the generator, a value of .1 mf. having been found to give satisfactory results. Also, assuming the frequency band of the acoustic wave to be 10–100 c.p.s. and since $X_{C_1}$ must be less than the value of the resistor $R_1$, a value of 150,000 ohms for the value of resistor $R_1$ has been found suitable for the purpose.

On FIG. 14 is shown an acceleration sensing unit indicated generally by the numeral 39 comprising a circular casing 40 and a support 41 having a pair of bearing shafts 42–43 connected diametrically thereto above the center of gravity of the device and each carrying a ball bearing on the outer end portion thereof fitted into end plates supported by strain cables 26 similar to the device of FIG. 6. The device is prevented from axial movement along the cables by the pair of sleeves 31. Casing 40 is provided with a flexible diaphragm 45 secured at the upper periphery thereof by cover 46 preferably having a stop member 47, FIG. 15, extending interiorally in alignment with the axis of the casing to limit the upward movement of the diaphragm.

Figure 15:
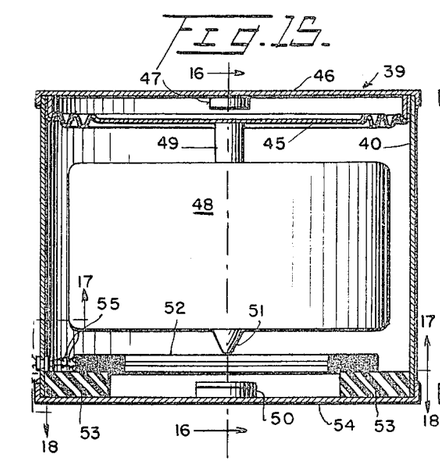
FIG. 15 is an enlarged view partially in section and partially in elevation of the acceleration sensing device of FIG. 14.
Figure 16:
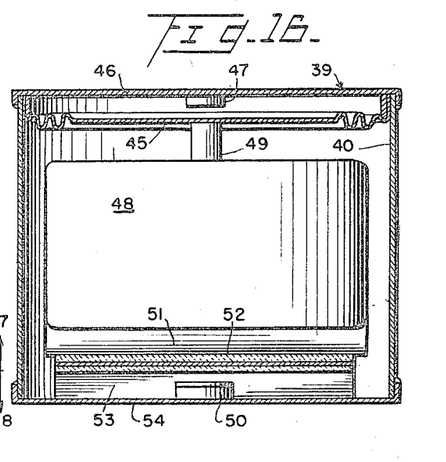
FIG. 16 is a view taken substantially along the line 16—16 of FIG. 15.
Figure 17:
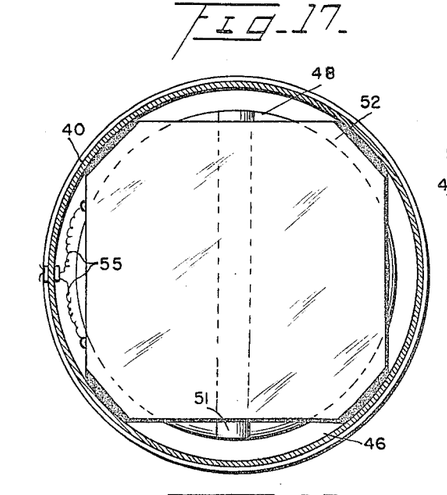
FIG. 17 is a view taken along the line 17—17 of FIG. 15.
Figure 18:
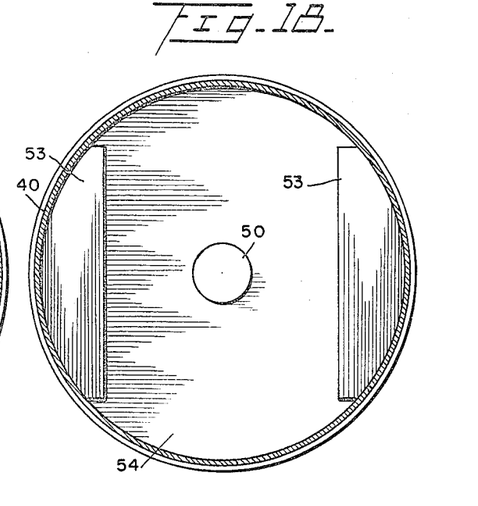
FIG. 18 is a sectional view taken along the line 18—18 of FIG. 15.
Figure 19:
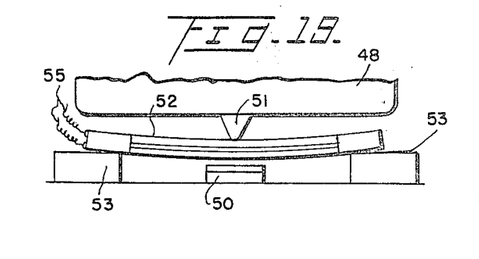
FIG. 19 is a diagrammatic view of the piezoelectric crystal of FIG. 15 in a moved or stressed condition.

A relatively heavy cylindrical mass 48 is connected to the central portion of the diaphragm by the member 49, FIGS. 15–16, substantially as shown and provided with a bearing edge 51 which may be composed preferably of rigid insulating material such, for example, as linen Bakelite projecting downwardly and extending across a diametrical portion thereof. A ceramic bimorph piezoelectric element 52 is carried by a pair of supports 53 preferably composed of rigid insulating material suitable for the purpose in such a manner that the mass 48 is in contact with the piezoelectric element along the bearing edge 51 and normally lightly supported thereby. In the event that the edge 51 is composed of metal, means are provided for preventing a circuit connection between the bearing edge 51 and the casing 40.

The casing 40 is provided with a bottom cover 54 having a stop member 50 to limit downward movement of the bimorph element 52 and mass 48. The supports 53 are secured to this cover member 54 in any suitable manner substantially as shown. The bimorph element is provided with a pair of conductors 55 for establishing an electrical connection to the disks 56–57 each of which is in contact with a brush having a conductor 58 connected thereto for establishing an external electrical connection to the device continuously regardless of rotative or oscillatory movement of the acceleration sensing device about the axis of rotation thereof.

The casing 40 is also provided with a quantity of oil of suitable viscosity to prevent the acceleration unit from singing at its natural frequency which, in the instant case of the unit described and illustrated, has been found to be approximately 200 c.p.s. Oil such, for example, as silicone oil having a constant viscosity over a wide temperature range has been found suitable for the purpose.

The acceleration unit, like the displacement unit of FIG. 6, is provided with an outer cylindrical casing 59 but differs from the casing of FIG. 6 in the omission of the perforations 24 therein and the apertures in the end plates. The casing 59 is snugly fitted in sealed relation to the end plates supporting the ball bearings thereby providing a casing structure which is air filled although, if desired, a small quantity of oil may be enclosed therein just sufficient to provide damping of the oscillations of the gimbal mounted structure, should this be necessary. Each end plate is provided with outwardly projecting apertured ears 25 for supporting the casing by the strain cables 26.

By employing a relatively heavy mass 48 resiliently supported within a light casing by a bimorph piezoelectric element and somewhat by the diaphragm 45, acceleration of the casing by an acoutic wave causes the bimorph element to be deflected and generate a voltage which is proportional to the degree of acceleration of the device.

On FIG. 3 is shown the acceleration sensing device of FIG. 14 connected to an electrical integrator circuit constructed and arranged to provide an output which is proportional to the particle velocity of the acoustic wave sensed by the acceleration sensing device. The integrator circuit comprises a capacitor $C_1$ connected in series with a resistor $R_1$ to the output terminals of the acceleration sensing device. If, as in the previous assumed example, the acceleration device comprises a sufficient number of acceleration sensors each having a bimorph piezoelectric element one inch long, one inch wide and having a thickness of .024 inch, all connected in parallel such that the combined capacity is .3 mf., the value of capacity of capacitor $C_1$ should be less than .3 mf., a capacitor $C_1$ having a value of .1 mf. has been found suitable to effect the desired result.

Furthermore, as in the previous assumed example, if the frequency of the acoustic wave lies within the range of 10–100 c.p.s. the value of resistance of resistor $R_1$ may be 150,000 ohms, since the reactance capacity should be less than the resistance value of $R_1$, and a voltage proportional to particle velocity of the acoustic wave is thus produced.

Figure 4:
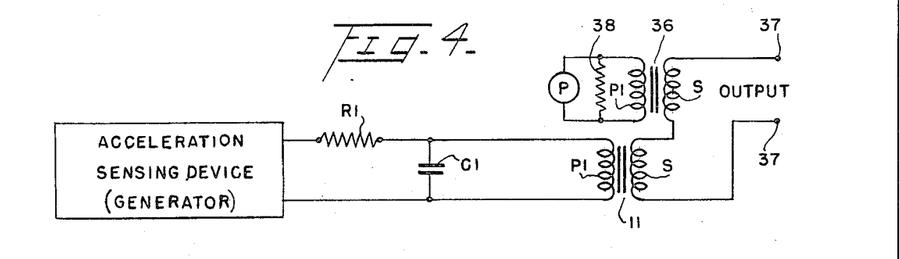
FIG. 4 is a circuit arrangement suitable for use with the present invention and employing the device of FIG. 3.

The manner in which the integrated output of the acceleration devices compensated to produce a voltage proportional to wave velocity is combined with the output of the pressure sensing devices to produce a geophysical instrument having a cardioid directional pattern will best be understood by reference to FIG. 4. The pressure sensing devices P shunted by resistance element 38 are connected to the primary winding $P_1$ of the transformer 36. The secondary winding S of transformer 36 is connected to a pair of output terminals 37 in series with the secondary winding S of transformer 11. The primary winding $P_1$ of transformer 11 is connected across capacitor $C_1$ to receive the integrated output of the acceleration sensing devices 39.

An arrangement is thus provided in which the particle acceleration or vector element of the acoustic wave is combined with the pressure or scalar element of the wave to produce a geophysical instrument with a cardioid directional pattern.

Accelerometer devices comprising semiconductor strain gauge elements and magnetostriction components may, if desired, be employed in lieu of the specific accelerometer herein illustrated and described. Furthermore, displacement and acceleration sensors employed with the present invention may vary in size and the number thereof may be greater or less than the number assumed in the examples described herein it being understood that the resistance R should be less than the reactance capacity for the pass band of the desired frequency range in the case of the wave displacement sensors and in the case of the wave acceleration sensors the capacity of the capacitor $C_1$ shall be less than the combined capacity of the wave acceleration sensors.

Moreover in the case of the wave acceleration sensors, the reactance capacity of the capacitor $C_1$ shall be less than the resistance of resistor $R_1$.

Whereas the invention has been described with particular reference to two examples which give satisfactory results, it is not so limited as it will be apparent to one skilled in the art, after understanding the invention, that various changes and modifications may be made and various instrumentalities employed without departing from the spirit and scope of the invention and it is our intention, therefore, in the appended claims to cover all such changes, modifications and instrumentalities.

What we claim as new and desire to be secured by Letters Patent of the United States is:

1. In a waterborne seismic prospecting system for subaqueous geological structures, in combination,
   (1) an oil filled flexible elongated neutrally buoyant detector streamer adapted to be towed at various depths of submersion beneath the surface of a body of water,
   (2) a plurality of pressure responsive detectors disposed at intervals within the streamer throughout the length thereof for providing an electrical signal correlative with the character of a seismic wave reflected from sub-bottom strata beneath the streamer and the air-water interface respectively,
   (3) a first transformer,
   (4) a signal output circuit coupled by said first transformer to said pressure responsive detectors,
   (5) a plurality of vertically mounted and parallel connected particle displacement detectors disposed at intervals within the streamer and interspersed with the pressure responsive detectors,
   (6) a second transformer,
   (7) and an electrical differentiator connected to said parallel connected particle displacement detectors and coupled by said second transformer to said signal output circuit in a manner to generate a voltage signal of equal and opposite polarity to the signal generated by the pressure responsive detectors in response to a secondary wave reflected downwardly from the surface of the water and impinging on the streamer at each of said depths of submersion thereof.

2. A detector streamer according to claim 1 in which,
   (1) said electrical differentiator comprises a resistance element of less resistive value than the combined capacitive reactance of said parallel connected particle displacement detectors within a predetermined range of band pass frequencies.

3. A detector streamer according to claim 2 in which the particle displacement detectors each comprises
   (1) a circular flexible diaphragm having a substantially rigid conical configured central section constructed and arranged for vertical movement in either direction selectively in accordance with the intensity and direction of vertical movement of particle displacement of an acoustic wave sensed thereby,
   (2) a heavy gimbal mounted annular member supporting at one end portion thereof said circular diaphragm in a substantially horizontal position along a peripheral portion of the diaphragm,
   (3) a substantially flat elongated piezoelectric element secured at one end portion thereof to the opposite end portion of said annular member beneath said diaphragm with the other end portion of the element in substantial alignment with the axis of said conical section,
   (4) and a rod like element connected at opposite ends to the central portion of said conical section and to said other end portion of the piezoelectric element respectively whereby the piezoelectric element is flexed variably in either direction in accordance with the direction and degree of movement of said diaphragm relative to said annular member in response to the instantaneous particle displacement of an acoustic wave sensed by said diaphragm.

4. The method of effecting a high fidelity seismic survey of water covered areas which comprises the steps of
   (1) initiating an acoustic impulse within the water,
   (2) generating an electrical seismic signal corresponding to a pressure wave from said impulse and reflected upwardly from the subbottom and thereafter downwardly from the air-water interface and applying said electrical signal to the primary winding of a first transformer,
   (3) generating a second electrical seismic signal corresponding to particle displacement of the acoustic wave reflected concurrently with said pressure wave upwardly from the subbottom and downwardly from the air-water interface and received at substantially the same depth of submersion at which the reflected pressure wave was received,
   (4) differentiating the seismic electrical signals corresponding to particle displacement of the acoustic wave to effect a signal having the characteristics of wave velocity and applying the differentiated signals to the primary winding of a second transformer,
   (5) and combining the differentiated electrical signal corresponding to the particle velocity of the acoustic wave reflected downwardly from the air-water interface with the first named electrical signal corresponding to a pressure wave reflected downward from the air-water interface by connecting the secondary windings of said first and second transformers serially to an output circuit in a manner to effect mutual cancellation of the signals caused by the downwardly reflected waves.

5. The method of effecting a high fidelity survey of water covered areas which comprises the steps of,
   (1) initiating an acoustic impulse within the water,
   (2) generating an electrical seismic signal corresponding to a pressure wave received within the water from said impulse and reflected upwardly from the subbottom and thereafter downwardly from the air-water interface and applying said electrical signal to the primary winding of a first transformer,
   (3) generating a second electrical seismic signal corresponding to particle acceleration of the acoustic wave reflected concurrently with said pressure wave upwardly from the subbottom and thereafter downwardly from the air-water interface and received at substantially the same depth of submersion at which the reflected pressure wave was received, (4) integrating the seismic electrical signals corresponding to particle acceleration of the acoustic wave to effect a seismic signal having the characteristics of wave velocity and applying the integrated signals to the primary winding of a second transformer, (5) and combining the integrated electrical signal corresponding to the particle acceleration of the acoustic wave reflected downwardly from the air-water interface with the first named electrical signal corresponding to a pressure wave reflected downwardly from the air-water interface by connecting the secondary windings of said first and second transformers serially to an output circuit in a manner to effect mutual cancellation of the signals caused by the downwardly reflected waves.

6. A waterborne seismic prospecting system for subaqueous geological structures comprising
(1) an oil filled detector stream adapted to be towed at various depths of submersion within a body of water,
(2) a plurality of pressure responsive devices disposed at intervals within the streamer for providing an electrical signal correlative with a seismic wave reflected from subbottom strata beneath the streamer and from the air-water interface respectively.
(3) a plurality of parallel connected particle displacement detectors vertically supported and interspersed with said pressure responsive devices within said streamer for providing an electrical signal correlative with the particle displacement of a seismic wave reflected from the subbottom strata beneath the streamer and from the air-water interface respectively,
(4) an electrical differentiator connected to the output of said particle displacement detectors and to said pressure responsive devices in a manner to generate a voltage signal of equal and opposite polarity to the signal generated by the pressure responsive devices in response to an acoustic wave reflected downwardly from said air-water interface,
(5) gimbal mounting means secured interiorly to said detector streamer for supporting and maintain said particle displacement detectors in a substantially vertical position within the streamer while the streamer is submerged within the water whereby the detectors respond to particle displacement of a downwardly moving acoustic wave applied thereto,
(6) a transformer having the primary winding thereof connected to said pressure responsive devices,
(7) a second transformer having the primary winding thereof connected to said differentiator and particle displacement detectors,
(8) an output circuit, and
(9) means connecting the secondary windings of said transformers in series with said output circuit in such manner that the differentiated wave signal generated by the particle displacement detectors in response to downward movement of an acoustic wave detected thereby is in opposition to and cancels the pressure wave signal of said downwardly moving acoustic wave generated by the pressure responsive devices.

7. An elongated flexible oil filled detector streamer for use with a seismic prospecting system and adapted to be towed at different depths of submersion within the water by a moving vessel,
(1) a plurality of parallel connected sensing devices within the streamer and adapted to generate electrical signals in accordance with pressure impulses received thereby while the streamer is moving through the surrounding water, said pressure impulses corresponding to seismic waves reflected from geological structures beneath the water and from the air-water interface respectively,
(2) a plurality of parallel connected particle acceleration detectors interspersed with said pressure sensing devices within the streamer for providing an electrical signal correlative with the particle acceleration of a seismic wave reflected from the subbottom strata beneath the streamer and from the air-water interface respectively,
(3) an electrical integrator connected to the output of said particle acceleration detectors and to said pressure responsive devices in a manner to generate an integrated voltage signal of equal and opposite polarity to the signal generated by the pressure sensing devices in response to an acoustic wave reflected downwardly from said air-water interface,
(4) a transformer having the primary winding thereof connected to said pressure sensing devices,
(5) a second transformer having the primary winding thereof connected to said electrical integrator and particle acceleration detectors,
(6) an output circuit,
(7) and means connecting the secondary windings of said transformers in series with said output circuit in such manner that the integrated wave signal generated by the particle acceleration detectors in response to downward movement of the acoustic wave detected thereby is in opposition to and cancels the pressure wave signal of said downwardly moving acoustic wave generated by the pressure sensing devices.

8. A detector streamer according to claim 7 including,
(1) gimbal mounting means for supporting and maintaining said particle acceleration detectors in a substantially vertical position within said streamer while the streamer is submerged within the water whereby the detectors respond to particle acceleration of a downwardly moving acoustic wave applied thereto.

9. A detector streamer according to claim 8 including,
(1) a transformer having the primary winding thereof connected to said pressure sensing devices,
(2) a second transformer having the primary winding thereof connected to said electrical integrator and particle acceleration detectors,
(3) an output circuit,
(4) and means connecting the secondary windings of said transformers in series with said output circuit in such manner that the integrated wave signal generated by the particle acceleration detectors is in opposition to and cancels the pressure wave signal of said downwardly moving acoustic wave generated by the pressure sensing devices.

10. A detector streamer according to claim 8 in which the particle acceleration detectors each comprises,
(1) a sealed cylindrical casing carried by said gimbal mounting means and having a quantity of oil therein,
(2) a flexible perforated diaphragm secured interiorly within said casing at an upper portion thereof,
(3) a circular mass suspended from the center portion of said diaphragm coaxial with said casing and movable axially therein, said mass having an edge portion diametrically depending therefrom,
(4) a piezoelectric element supported at opposite ends thereof within said casing and a transverse central portion thereof in normal engagement with the depending edge portion of said mass, for flexure thereby as the mass is moved by an inertial force relative to said casing,
(5) and means including a pair of conductors and at least one electrical insulating member extending through said casing in sealed relation therewith for establishing an external electrical connection to said piezoelectric element.

11. A detector streamer according to claim 10 including
(1) gimbal structure secured interiorly within said streamer and clamped about said casing above the center of gravity thereof for maintaining the particle acceleration detector in a substantially vertical position while the streamer is disposed within a body of water.

12. A detector streamer according to claim 11 including,
   (1) a pair of metallic disk members carried by said gimbal structure and electrically connected to said piezoelectric element,
   (2) and a pair of brushes each respectively cooperative with said disk members for establishing an external electrical circuit continuously to said piezoelectric element during rotative movement of said particle acceleration detector.

References Cited by the Examiner
UNITED STATES PATENTS

| | | | |
|---|---|---|---|
| 2,251,973 | 8/1941 | Beale et al. | 73—503 |
| 2,465,696 | 3/1949 | Paslay | 340—7 X |
| 2,506,608 | 5/1950 | McLoad | 340—8 X |
| 2,590,530 | 3/1952 | Groenendyke | 340—7 |
| 2,740,945 | 4/1956 | Howes | 340—15.5 X |
| 3,012,180 | 12/1961 | Finvold | 73—503 X |

SAMUEL FEINBERG, *Primary Examiner.*

BENJAMIN A. BORCHELT, *Examiner.*

P. A. SHANLEY, *Assistant Examiner.*